United States Patent
Sugio

(10) Patent No.: US 10,173,660 B2
(45) Date of Patent: Jan. 8, 2019

(54) OIL SEPARATOR

(71) Applicant: NABTESCO AUTOMOTIVE CORPORATION, Tokyo (JP)

(72) Inventor: Takuya Sugio, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 113 days.

(21) Appl. No.: 14/770,130

(22) PCT Filed: Feb. 26, 2014

(86) PCT No.: PCT/JP2014/054746
§ 371 (c)(1),
(2) Date: Aug. 25, 2015

(87) PCT Pub. No.: WO2014/133035
PCT Pub. Date: Sep. 4, 2014

(65) Prior Publication Data
US 2016/0001758 A1 Jan. 7, 2016

(30) Foreign Application Priority Data
Feb. 26, 2013 (JP) ................. 2013-036393

(51) Int. Cl.
*B01D 47/00* (2006.01)
*B60T 17/00* (2006.01)
(Continued)

(52) U.S. Cl.
CPC ............ *B60T 17/004* (2013.01); *B01D 45/02* (2013.01); *B01D 45/04* (2013.01); *B01D 45/08* (2013.01);
(Continued)

(58) Field of Classification Search
CPC ......... F01N 3/037; F04B 39/04; B01D 45/08; B01D 46/0031; B01D 45/02; B01D 45/04;
(Continued)

(56) References Cited

U.S. PATENT DOCUMENTS 1,621,026 A * 3/1927 Pukerud ................ H01H 33/57
220/747
2,776,054 A * 1/1957 Hirshstein .......... B01D 17/0211
210/257.1
(Continued)

FOREIGN PATENT DOCUMENTS

JP  H01-114025 U  8/1989
JP  H01-156729 U  10/1989
(Continued)

OTHER PUBLICATIONS

International Preliminary Report on Patentability as issued in International Patent Application No. PCT/JP2014/054746, dated Sep. 1, 2015.
International Search Report as issued in International Patent Application No. PCT/JP2014/054746, dated Jun. 17, 2014.

*Primary Examiner* — Dung H Bui
(74) *Attorney, Agent, or Firm* — Pillsbury Winthrop Shaw Pittman, LLP

(57) ABSTRACT

An oil separator is provided that restrains cleaned air from entraining collected liquid. An oil separator causes purge air, which has flowed into a case from an air dryer, to strike an impingement member, to separate oil, thereby recovering liquid containing oil and discharging cleaned air. The oil separator includes, inside the case, a baffle plate, which restrains cleaned air from coming contacting collected liquid.

10 Claims, 10 Drawing Sheets

(51) Int. Cl.
*B01D 45/02* (2006.01)
*B01D 45/04* (2006.01)
*B01D 45/08* (2006.01)
*F04B 39/16* (2006.01)
*F04B 39/04* (2006.01)
*B01D 46/00* (2006.01)
*F01M 11/08* (2006.01)
*F01N 3/037* (2006.01)
*F01M 13/04* (2006.01)

(52) U.S. Cl.
CPC .............. *F04B 39/04* (2013.01); *F04B 39/16* (2013.01); *B01D 46/0031* (2013.01); *F01M 11/08* (2013.01); *F01M 2013/0433* (2013.01); *F01N 3/037* (2013.01)

(58) Field of Classification Search
CPC ........... F01M 11/08; F01M 2013/0433; F01M 2013/0438; F01M 2013/045; F01M 2013/0461; F01M 2013/0477; F01M 2013/0072
See application file for complete search history.

(56) References Cited

U.S. PATENT DOCUMENTS

| | | | | |
|---|---|---|---|---|
| 3,201,924 | A | * | 8/1965 | Fulford ................ B01D 46/002 55/324 |
| 3,432,991 | A | * | 3/1969 | Sauder ................... C10G 33/02 204/563 |
| 6,058,917 | A | * | 5/2000 | Knowles ................ F01M 13/04 123/573 |
| 2004/0040273 | A1 | * | 3/2004 | Lewin .................... B01D 45/12 55/447 |
| 2012/0180442 | A1 | * | 7/2012 | Siber ..................... B01D 45/06 55/337 |

FOREIGN PATENT DOCUMENTS

| | | |
|---|---|---|
| JP | H02-147212 U | 12/1990 |
| JP | H06-42476 A | 2/1994 |
| JP | H06-109345 A | 4/1994 |
| JP | H08-233415 A | 9/1996 |
| JP | H10-296038 A | 11/1998 |
| JP | 2004-176701 A | 6/2004 |

* cited by examiner

OIL SEPARATOR

CROSS-REFERENCE TO RELATED APPLICATIONS

This application is the U.S. National Stage of PCT/JP2014/054746, filed Feb. 26, 2014, which in turn claims priority to Japanese Patent Application No. JP 2013-036393, filed Feb. 26, 2013. The contents of these applications are incorporated herein by reference in their entireties.

TECHNICAL FIELD

The present invention relates to an oil separator that separates oil contained in air that has passed through equipment.

BACKGROUND ART

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the inside of the compressor. When the compressed air containing such water and oil enters inside the systems, it causes rust and swelling of rubber members (such as O-rings) and results in an operational defect. Thus, an air dryer is provided downstream of the compressor in a pneumatic system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water adsorbed by the desiccant and discharging it to the outside.

PRIOR ART DOCUMENTS

Patent Documents

Patent Document 1: Japanese Laid-Open Patent Publication No. 10-296038

SUMMARY OF THE INVENTION

Problems that the Invention is to Solve

The air discharged from the air dryer during regeneration of the desiccant contains oil together with water. Considering the burden on the environment, an oil separator may be provided downstream of the compressor in the pneumatic system. This oil separator allows air that contains oil to strike an impingement member provided in the housing to separate the oil from the air and recovers the oil. The oil separator then discharges cleaned air.

Collected liquid, which is stored in the housing, may be raised by the cleaned air, from which oil has been removed, when the cleaned air passes through the housing. As a result, cleaned air containing oil may be discharged to the outside of the housing. Thus, an oil separator has been desired that prevents cleaned air from carrying collected liquid in the housing to the outside.

Accordingly, it is an objective of the present invention to provide an oil separator that prevents cleaned air from carrying collected liquid in the housing to the outside.

Means for Solving the Problems

Means for achieving the above objectives and advantages thereof will now be discussed.

To achieve the foregoing objective and in accordance with one aspect of the present invention, an oil separator that includes a housing and an impingement member located in the housing is provided. The oil separator introduces purge air into the housing from an air dryer, causes the purge air to strike the impingement member to separate oil from the introduced purge air, thereby recovering collected liquid containing the oil, and discharges cleaned air. The oil separator includes a baffle plate located in the housing, wherein the baffle plate restrains the cleaned air from contacting the collected liquid.

With this configuration, a baffle plate is provided in the housing. When cleaned air, from which oil has been separated, passes through the housing, the baffle plate hampers the flow of the cleaned air and allows the cleaned air to be discharged to the outside without contacting collected liquid. Thus, the cleaned air is prevented from carrying collected liquid in the housing to the outside.

In the above described oil separator, the baffle plate is preferably configured to float on a surface of the collected liquid stored in the housing. With this configuration, the baffle plate floats on the surface of the collected liquid to constantly cover the surface of the collected liquid. This prevents cleaned air, from which oil has been separated, from carrying the collected liquid to the outside of the housing.

In the above described oil separator, the baffle plate is preferably fixed to the housing.

With this configuration, the baffle plate is fixed in the housing, so that the baffle plate is constantly located at a fixed position without moving in the housing. At the fixed position, the baffle plate prevents cleaned air, from which oil has been separated, from carrying the collected liquid to the outside of the housing.

In the above described oil separator, an accommodation member is preferably located in the housing. The accommodation member preferably accommodates the impingement member and is located above a collected liquid storage portion, in which the collected liquid is stored, and the baffle plate is preferably located on an outer circumference of the accommodation member.

With this configuration, the baffle plate is provided on the outer circumference of the accommodation member. This prevents cleaned air, from which oil has been separated, from carrying the collected liquid to the outside of the housing, while reducing the area required for the baffle plate.

In the above described oil separator, the baffle plate preferably is located at a flange portion, which is provided at a distal end portion of the accommodation member. With this configuration, the baffle plate is provided on the flange portion of the accommodation member. This allows the baffle plate to be easily positioned. Further, in a case in which a baffle plate is configured to float on the surface of collected liquid, the baffle plate can be supported by the flange portion until a sufficient amount of liquid is collected and the baffle plate starts floating on the surface of the collected liquid.

In the above described oil separator, the baffle plate preferably has a gap for allowing separated oil to drip.

With this configuration, a gap is provided in the baffle plate. Thus, oil and the like that have dropped onto the baffle plate is allowed to drip readily into the collected liquid storage portion from the gap.

EFFECTS OF THE INVENTION

The present invention prevents cleaned air from entraining collected liquid.

MODES FOR CARRYING OUT THE INVENTION

First Embodiment

An oil separator according to a first embodiment will now be described with reference to FIGS. 1 to 8.

Figure 1:
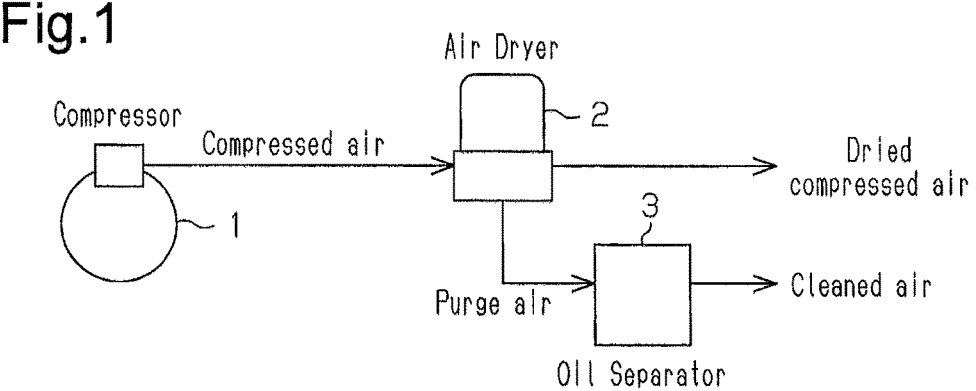
FIG. 1 is a block diagram illustrating an installation position of an oil separator according to a first embodiment in a pneumatic system.

As shown in FIG. 1, vehicles such as trucks, buses, and construction machines utilize compressed air delivered from a compressor 1 to control systems such as brakes and suspensions. Thus, an air dryer 2, which removes oil and water in the compressed air and supplies dried air, is located downstream of the compressor 1 of a pneumatic system. The air dryer 2 incorporates a desiccant. The air dryer 2 performs dehumidification to remove oil and water from the compressed air and regeneration to regenerate the desiccant by removing the oil and water adsorbed by the desiccant and discharging them to the outside.

In the present embodiment, since air (purge air) that is discharged from the air dryer 2 during regeneration of the desiccant contains oil together with water, an oil separator 3 is provided downstream of the compressor 1 of the pneumatic system, taking the burden on the environment into consideration. In particular, the oil separator 3 is provided in an exhaust system of the air dryer 2 to separate and recover oil and water from purge air discharged during regeneration of the desiccant in the air dryer 2.

The oil separator 3 is an impingement plate type and includes, inside the housing, impingement members, against which air containing oil and water strikes. The impingement plate-type oil separator 3 performs gas/liquid separation by allowing air containing oil and water to strike the impingement members. In this manner, the oil separator 3 recovers oil from air and discharges cleaned air. The liquid that has been separated from air contains oil and water. Such liquid will hereafter be referred to as collected liquid in some cases.

Figure 2:
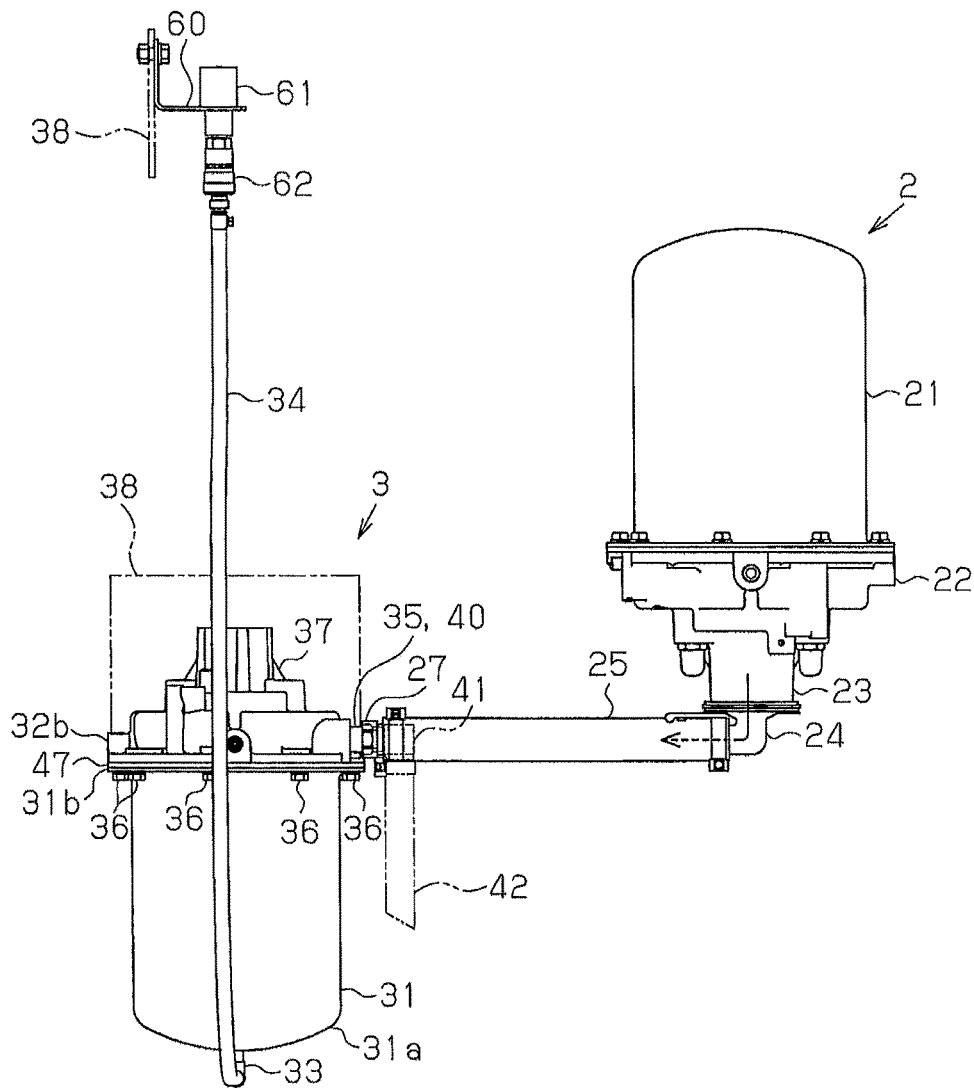
FIG. 2 is a diagram illustrating a mounting state of the oil separator of the first embodiment, which is connected to an air dryer.

As shown in FIG. 2, an air dryer 2 includes a cylindrical case 21 and a support member 22. The vertically upper end of the case 21 is closed. The support member 22 closes the opening portion of the case 21 and supports the case 21. A purge air outlet 23, which discharges purge air during regeneration of a desiccant, is formed at the lower section of the support member 22. A purge air discharge cover 24, to which a connecting hose 25 is connected, is attached to the purge air outlet 23. The connecting hose 25 is connected to an oil separator 3. The support member 22 of the air dryer 2 has an inlet (not shown) for introducing air compressed by the compressor 1 and an outlet (not shown) for discharging dried compressed air.

The oil separator 3 includes a cylindrical housing having a closed end and extending in the vertical direction, which is a case 31 in this embodiment, and a lid 32, which closes the opening portion of the case 31. A drain outlet 33 for draining the collected liquid that has been stored is provided at a bottom portion 31a of the case 31. A drain hose 34, which is used when removing the collected liquid, is connected to the drain outlet 33. The lid 32 has an inlet 35 for introducing purge air from the air dryer 2 through the connecting hose 25 and an outlet 40 for discharging cleaned air from which oil has been separated. The inlet 35 and the outlet 40 are formed separately. The inlet 35 and the connecting hose 25 are connected to each other by a coupling member 27.

A discharge hose 42 is connected to the outlet 40 of the oil separator 3 via a connecting member 41, which extends in the horizontal direction and bends vertically upward.

A mounting member 37 is formed integrally with the lid 32 of the oil separator 3. The mounting member 37 extends upright from the lid 32. The mounting member 37 is secured to a chassis 38 with bolts.

The distal end of the drain hose 34 is detachably attached to a support member 60, which is secured to, for example, the chassis 38 of the vehicle. That is, a securing member 61 is secured to the support member 60. A one-touch coupler 62 is secured to the lower end of the securing member 61. The one-touch coupler 62 allows the distal end of the drain hose 34 to be attached to the securing member 61 by a single operation. The distal end of the drain hose 34 is secured to the securing member 61 by being inserted into the one-touch coupler 62, and is detached from the securing member 61 by manipulating the one-touch coupler 62. The distal end of the drain hose 34 is attached to the securing member 61 to face vertically upward. The distal end of the drain hose 34 is located above the lid 32 of the oil separator 3. Thus, the collected liquid is prevented from leaking from the distal end of the drain hose 34.

Figure 3:
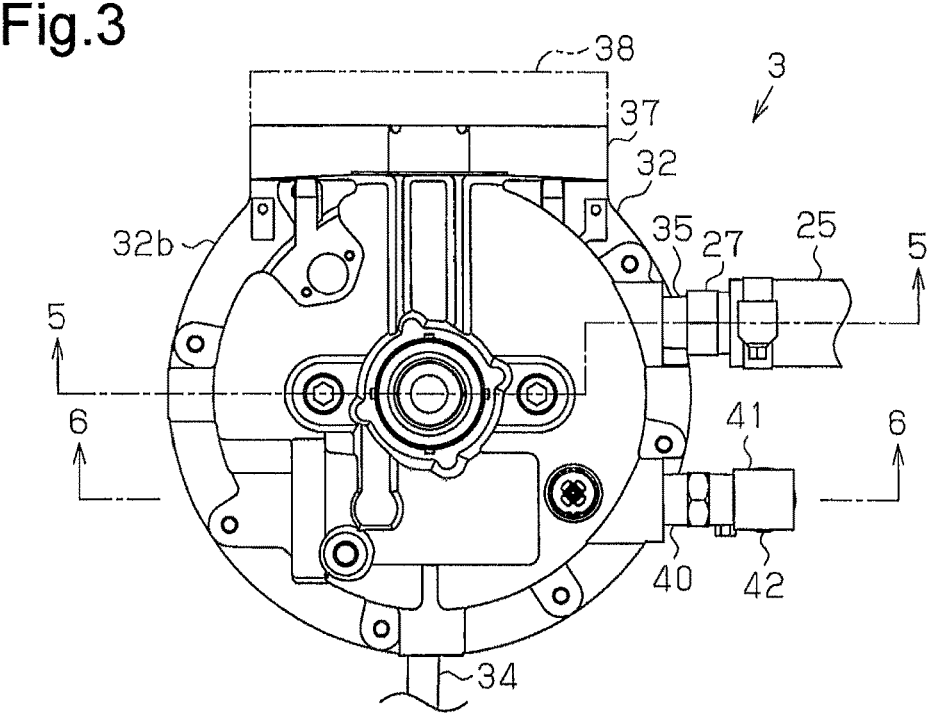
FIG. 3 is a top view illustrating the position of an inlet and an outlet of the oil separator of the first embodiment.
Figure 4:
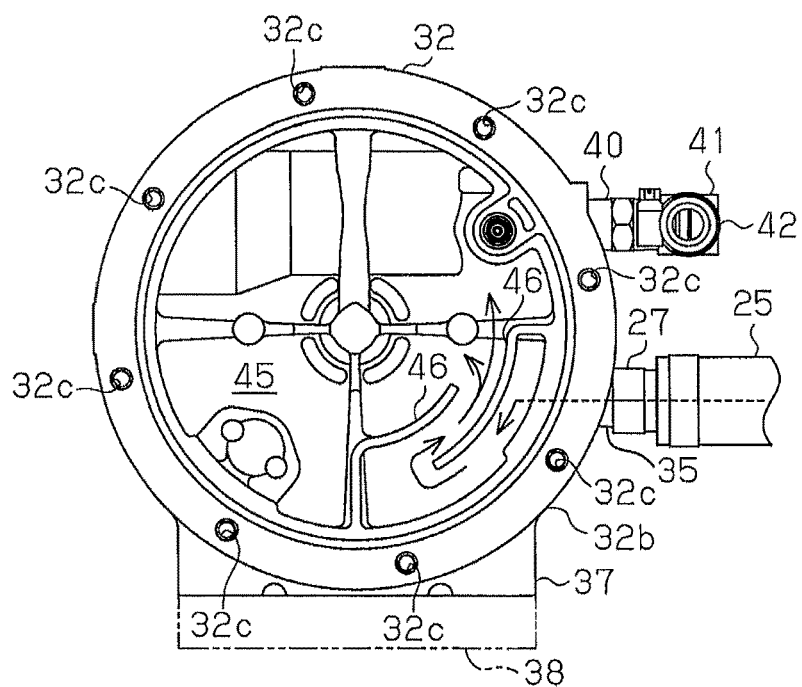
FIG. 4 is a bottom view illustrating the inside of the lid of the oil separator of the first embodiment.

As shown in FIGS. 3 and 4, the inlet 35 and the outlet 40 of the lid 32 are open in the same direction. The connecting hose 25 is connected to the inlet 35 via the coupling member 27. The connecting member 41 is connected to the outlet 40. That is, the coupling member 27 and the connecting member 41 are arranged side by side.

Figure 5:
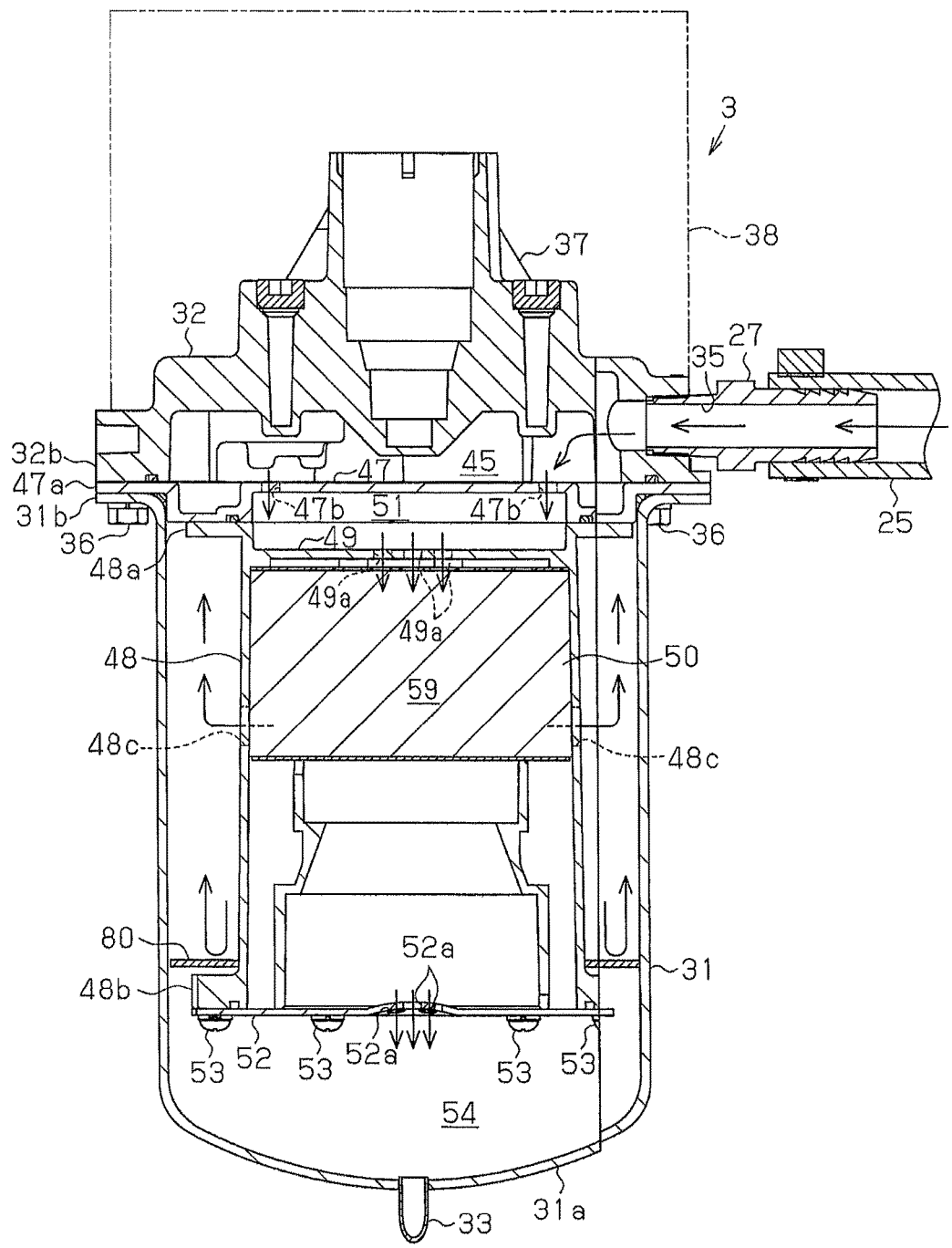
FIG. 5 is a cross-sectional view taken along line 5-5 of FIG. 3, illustrating the internal structure of the oil separator of the first embodiment.

As shown in FIG. 5, the lid 32 is a cylinder having a vertically upper end closed. Two baffle plates 46 extend from the inner wall of the lid 32 in the vicinity of the inlet 35 to be perpendicular to the flow direction of the purge air introduced through the inlet 35. The internal space of the lid 32 functions as a first expansion chamber 45, which expands the purge air introduced from the inlet 35. The lid 32 has a communication section 32a, which connects the inside of the case 31 to the outlet 40.

Figure 6:
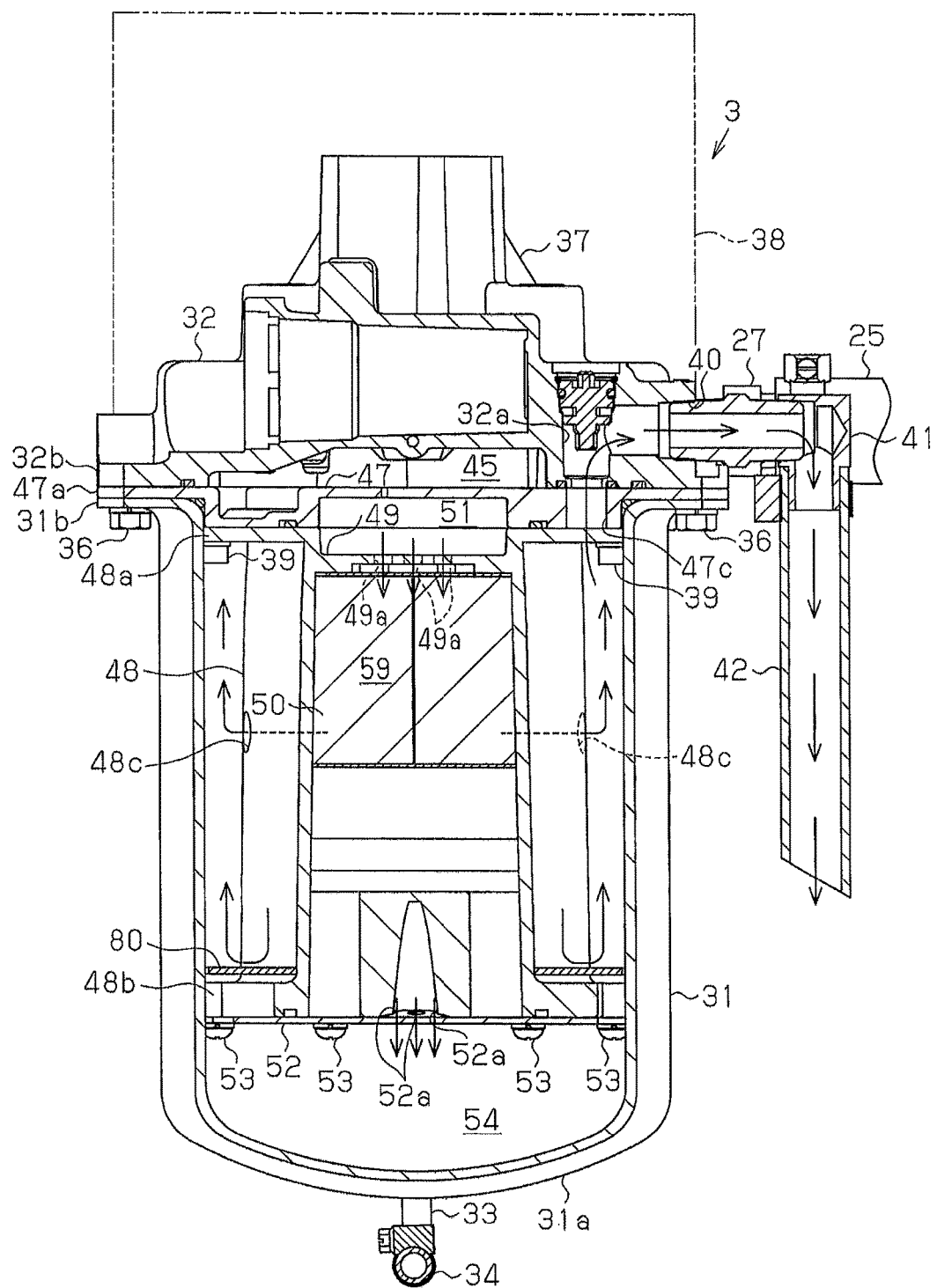
FIG. 6 is a cross-sectional view taken along line 6-6 of FIG. 3, illustrating the internal structure of the oil separator of the first embodiment.

As shown in FIG. 6, a disk-like cover 47, which closes the case 31 and the opening portion of the lid 32, is provided between the case 31 and the lid 32. The cover 47 and the case 31 are fastened to the lid 32 with bolts 36. That is, the bolts 36 are fastened to threaded bores 32c formed in a flange portion 32b of the lid 32. Furthermore, threaded portions of the bolts 36 extend through through-holes formed in a flange portion 31b of the case 31. The cover 47 has through-holes through which the threaded portions of the bolts 36 extend. Thus, the threaded portions of the bolts 36 extend through the through-holes of the flange portion 31b of the case 31 and the through-holes of a flange portion 47a of the cover 47. The bolts 36 are then screwed to the threaded bores 32c of the flange portion 32b of the lid 32 so that the lid 32, the cover 47, and the case 31 are fastened together. The cover 47 has a communication hole 47c, which connects the inside of the case 31 to the outlet 40.

The space formed by the lid 32 and the cover 47 functions as the first expansion chamber 45. A cylindrical accommodation member 48 having a vertically upper end closed is secured to the cover 47 with bolts 39. The accommodation member 48 accommodates a urethane foam block 50 such as a sponge. The urethane foam block 50 functions as an impingement member. A flange portion 48a and a flange portion 48b are formed at an upper edge and a lower edge of the accommodation member 48, respectively. The bolts 39 extend through the flange portion 48a formed at the upper edge of the accommodation member 48 so that the accommodation member 48 is fastened to the cover 47. The space formed by the cover 47 and upper surface of the accommodation member 48 functions as a second expansion chamber 51. The cover 47 has through holes 47b, which connect the first expansion chamber 45 to the second expansion chamber 51. Through holes 49a are formed at the center portion of an upper base 49 of the accommodation member 48. The through holes 47b of the cover 47 and the through holes 49a of the upper base 49 of the accommodation member 48 are formed at positions that are not opposed to each another. The accommodation member 48 has through holes 48c formed at the lower end of the side face at intervals in the radial direction.

A disk-like support lid 52 is secured to the flange portion 48b, which is formed at the lower edge of the accommodation member 48, with screws 53. The support lid 52 supports the accommodated urethane foam block 50. The support lid 52 is formed to have a diameter that is substantially the same as the inner diameter of the case 31. The space formed by the upper base 49 of the accommodation member 48 and the support lid 52 functions as a third expansion chamber 59. The support lid 52 has through holes 52a, which permit the oil and water removed by the urethane foam block 50 to drop. Thus, the lower section in the case 31 functions as a collected liquid storage portion 54.

Figure 8:
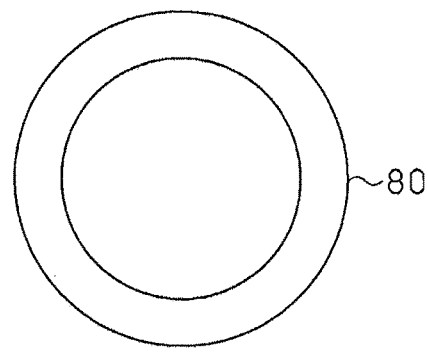
FIG. 8 is a top view illustrating the shape of the baffle plate used in the oil separator of the first embodiment.

As shown in FIGS. 5 and 6, the case 31 accommodates an annular baffle plate 80 on the outer circumference of the accommodation member 48 (refer to FIG. 8). The inner diameter of the baffle plate 80 is substantially the same as the outermost diameter of the accommodation member 48 except for the flange portions 48a, 48b. The outer diameter of the baffle plate 80 is substantially the same as the inner diameter of the case 31. The baffle plate 80 is placed on the upper surface of the flange portion 48b of the accommodation member 48. When the surface of the collected liquid is located below the upper surface of the flange portion 48b of the accommodation member 48, the baffle plate 80 is supported by the flange portion 48b.

Figure 7:
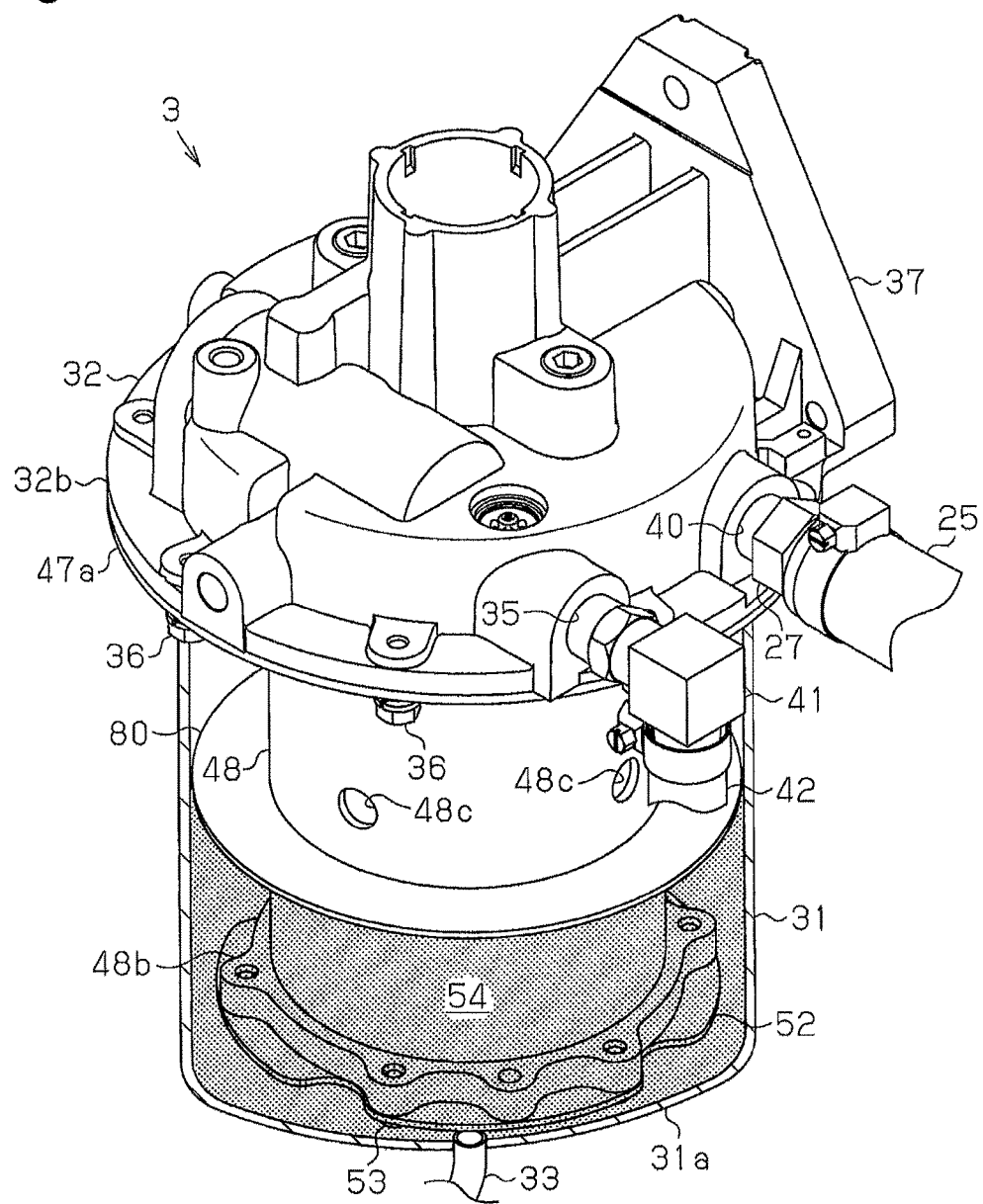
FIG. 7 is a partially cut away view illustrating the internal structure of the oil separator of the first embodiment.

When the upper surface of the collected liquid is located above the upper surface of the flange portion 48b of the accommodation member 48 as shown in FIG. 7, the baffle plate 80 floats on the surface of the collected liquid stored in the collected liquid storage portion 54. Thus, the baffle plate 80 is constantly located above the surface of he collected liquid and covers the surface of the collected liquid.

Operation of the oil separator 3 configured as described above will now be described.

As shown in FIG. 2, purge air discharged from the air dryer 2 is introduced to the oil separator 3. The purge air contains oil and water.

As shown in FIG. 5, the purge air introduced through the inlet 35 strikes the baffle plates 46, is introduced into the oil separator 3 along the baffle plates 46, and expands in the first expansion chamber 45.

As shown in FIG. 6, the air that has expanded in the first expansion chamber 45 enters the second expansion chamber 51 via the through holes 47b formed in the cover 47. The air that has expanded in the second expansion chamber 51 enters the third expansion chamber 59 via the through holes 49a of the upper base 49 of the accommodation member 48, so that oil and water strike the urethane foam block 50 and are separated from the air. The liquid containing the water and the oil trapped by the urethane foam block 50 reaches the support lid 52 through the inside of the urethane foam block 50 and then drops through the through hole 52a of the support lid 52 into the collected liquid storage portion 54, and is stored in the collected liquid storage portion 54. The liquid that has been stored in the collected liquid storage portion 54 enters the drain hose 34 from the drain outlet 33. Oil that has been separated from air in the space between the accommodation member 48 and the case 31 drops onto the baffle plate 80 along the outer wall of the accommodation member 48 and the inner wall of the case 31. The oil then drips into the collected liquid in the collected liquid storage portion 54 through the gap between the outer circumference of the baffle plate 80 and the inner wall of the case 31 or through the gap between the inner circumference of the baffle plate 80 and the outer wall of the accommodation member 48.

The amount of the collected liquid stored in the collected liquid storage portion 54 can be determined by checking the amount of the collected liquid stored in the drain hose 34. When the amount of the collected liquid approaches the upper limit, the collected liquid is drained from the collected liquid storage portion 54 through the drain hose 34.

Oil and water are separated from the air that has entered the accommodation member 48 from the through holes 49a of the upper base 49. The air then enters the case 31 from the through holes 48c in the side face of the accommodation member 48.

Part of the air that has entered the space between the accommodation member 48 and the case 31 flows toward the collected liquid storage portion 54 below the case 31. The baffle plate 80, which covers the surface of the collected liquid, prevents that part of the air from flowing to the vicinity of the collected liquid in the collected liquid storage portion 54, while allowing the air to flow to the upper part of the case 31. At this time, since the air does not raise the collected liquid, the air does not entrain oil. The air that has entered the space between the accommodation member 48 and the case 31 passes through the communication hole 47c of the cover 47 and the communication section 32a of the lid 32, and is discharged through the outlet 40. Thus, the air that has entered the case 31 hardly contacts the collected liquid in the collected liquid storage portion 54 and is discharged from the outlet 40. The air that is discharged from the outlet 40 is cleaned air that does not contain oil.

The first embodiment has the following advantages.

(1) The baffle plate 80 is provided in the case 31. Thus, when cleaned air, from which oil has been separated, passes through the case 31, the baffle plate 80 hampers the flow of the cleaned and allows the cleaned air to be discharged to the outside without contacting the collected liquid. This prevents the cleaned air from entraining the collected liquid.

(2) The baffle plate 80 floats on the surface of the collected liquid to constantly cover the surface of the collected liquid. This further prevents cleaned air, from which oil has been separated, from entraining the collected liquid.

(3) The baffle plate 80 is provided on the outer circumference of the accommodation member 48. This prevents cleaned air, from which oil has been separated, from entraining collected liquid, while reducing the area required for the baffle plate 80.

(4) The baffle plate 80 is provided on the flange portion 48b of the accommodation member 48. This allows the baffle plate 80 to be positioned easily. Further, in a case in which the baffle plate 80 is configured to float on the surface of collected liquid, the baffle plate 80 can be supported by the flange portion 48b until a sufficient amount of liquid is collected and the baffle plate 80 starts floating on the surface of the collected liquid.

Second Embodiment

An oil separator according to a second embodiment will now be described with reference to FIG. 11. The present embodiment is different from the first embodiment in that a baffle plate is fixed. Differences from the first embodiment will mainly be discussed below.

Figure 11:
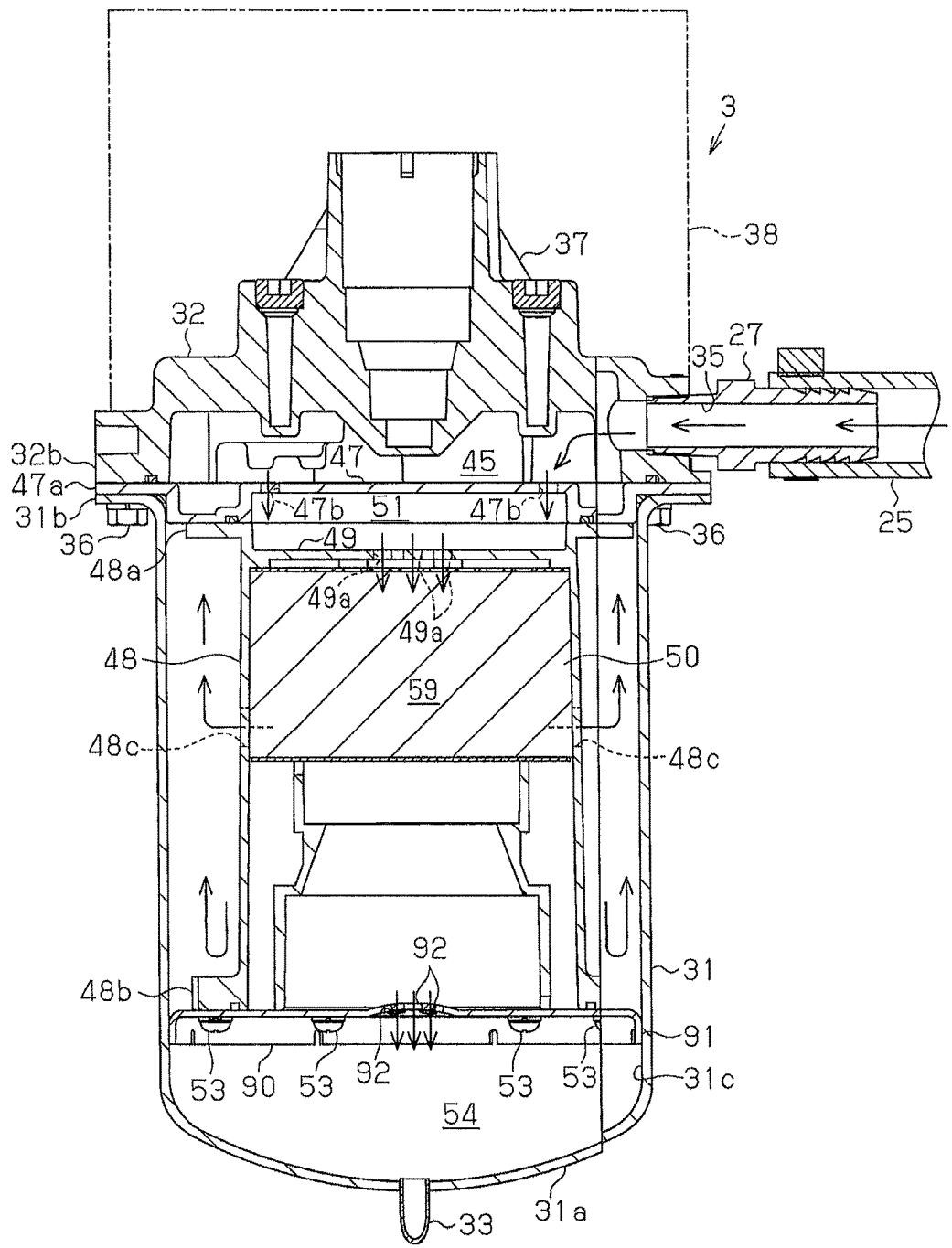
FIG. 11 is a cross-sectional view illustrating the internal structure of an oil separator according to a second embodiment.

As shown in FIG. 11, a cylindrical baffle plate 90 with a closed end is fixed to the lower end of the accommodation member 48 in the case 31. The baffle plate 90 opens in the direction away from the accommodation member 48. The baffle plate 90 replaces the support lid 52 of the first embodiment. That is, the baffle plate 90 supports the accommodated urethane foam block 50 and is fixed with the screws 53. The outer diameter of the outer circumferential surface 91 of the baffle plate 90 is substantially equal to the inner diameter of the inner circumferential surface 31c of the case 31. The baffle plate 90 has through holes 92, which permit oil and water removed by the urethane foam block 50 to drop. Thus, the interior of the case 31 is divided by the baffle plate 90, and the part of the interior of the case 31 below the baffle plate 90 functions as the collected liquid storage portion 54.

Operation of the oil separator 3 configured as described above will now be described. A case will be described in which purge air discharged from the air dryer 2 is introduced to the oil separator 3.

As shown in FIG. 11, the air that has expanded in the first expansion chamber 45 enters the second expansion chamber 51 via the through holes 47b formed in the cover 47. The air that has expanded in the second expansion chamber 51 enters the third expansion chamber 59 via the through holes 49a of the upper base 49 of the accommodation member 48, so that oil and water strike the urethane foam block 50 and are separated from the air. The liquid containing the water and the oil trapped by the urethane foam block 50 reaches the upper surface of the baffle plate 90 through the inside of the urethane foam block 50 and then drops through the through hole 92 of the baffle plate 90 into the collected liquid storage portion 54, and is stored in the collected liquid storage portion 54. The liquid that has been stored in the collected liquid storage portion 54 enters the drain hose 34 from the drain outlet 33.

In contrast, air from which oil and water have been separated enters the space between the accommodation member 48 and the case 31 through the through holes 48c in the side face of the accommodation member 48. Part of the air that has entered the space between the accommodation member 48 and the case 31 flows toward the collected liquid storage portion 54 below the case 31. That part of the air is prevented from entering the collected liquid storage portion 54 by the baffle plate 90. Thus, the baffle plate 80 blocks entry of the air into the vicinity of the collected liquid in the collected liquid storage portion 54, which causes the air to flow to the upper part of the case 31. At this time, since the air does not raise the collected liquid, the air does not entrain oil. The air that has entered the space between the accommodation member 48 and the case 31 passes through the communication hole 47c of the cover 47 and the communication section 32a of the lid 32, and is discharged through the outlet 40. The oil that has been separated from the air in the space between the accommodation member 48 and the case 31 drops onto the baffle plate 90 along the outer wall of the accommodation member 48 or the inner wall of the case 31. The oil then drips into the collected liquid in the collected liquid storage portion 54 through the gap between the outer circumference of the baffle plate 90 and the inner wall of the case 31. Thus, the air that has entered the case 31 hardly contacts the collected liquid in the collected liquid storage portion 54 and is discharged from the outlet 40. The air that is discharged from the outlet 40 is cleaned air that does not contain oil. Further, since the baffle plate 90 restrains the collected liquid stored in the collected liquid storage portion 54 from splashing due to vibrations generated during driving of the vehicle. This restrains collected liquid from being discharged through the outlet 40 due to splashing to the vicinity of the outlet 40 and oil from being entrained again in the cleaned air.

The second embodiment provides the following advantages in addition to the advantage (1) of the first embodiment.

(5) The baffle plate 90 is constantly located at a fixed position without moving in the case 31. This prevents cleaned air, from which oil has been separated, from entraining the collected liquid.

(6) The baffle plate 90 restrains splashing of collected liquid due to vibrations. This restrains the collected liquid from being discharged through the outlet 40 and oil from being entrained again in the cleaned air.

Third Embodiment

An oil separator according to a third embodiment will now be described with reference to FIG. 12. The present embodiment is different from the first embodiment in that a baffle plate is fixed and that a replaceable spin-on filter cartridge is used. Differences from the first embodiment will mainly be discussed below.

Figure 12:
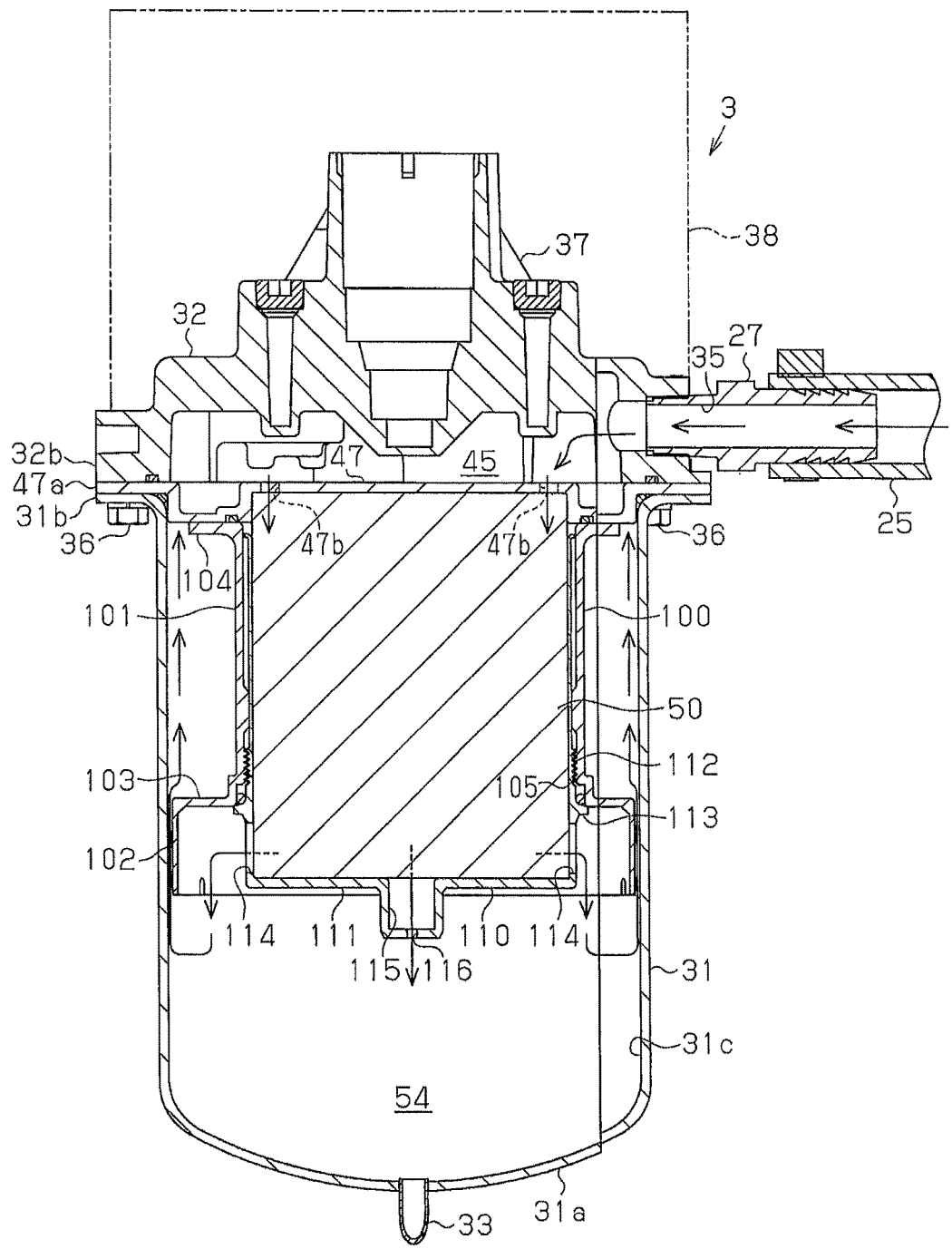
FIG. 12 is a cross-sectional view illustrating the internal structure of an oil separator according to a third embodiment.

As shown in FIG. 12, a cylindrical baffle plate 100 is fixed to the cover 47 with bolts (not shown). A filter cartridge 110 is attached to the baffle plate 100. The filter cartridge 110 accommodates a urethane foam block 50, which is, for example, a sponge. The baffle plate 100 includes a small diameter portion 101, a large diameter portion 102, a step portion 103 between the small diameter portion 101 and the large diameter portion 102, and a flange 104 provided at an edge of the small diameter portion 101. The outer diameter of the small diameter portion 101 is smaller than the inner diameter of the case 31. The outer diameter of the large diameter portion 102 is substantially equal to the inner diameter of the case 31. The flange portion 104 of the baffle plate 100 is located closer to the cover 47, and the large diameter portion 102 of the baffle plate 100 is located closer to the bottom of the case 31. The flange portion 104 is fixed to the cover 47 with bolts (not shown). A gap, the size of which allows passage of air, is defied between the outer circumferential surface of the large diameter portion 102 and the inner circumferential surface 31c of the case 31. An internal thread portion 105 is formed on the inner circumferential surface of the small diameter portion 101.

The filter cartridge 110 includes a cylindrical filter case 111, which has a closed end at the vertical bottom, and the urethane foam block 50, which is, for example, a sponge and functions as a filter. The urethane foam block 50 is accommodated in and fills the entire space defined by the cover 47 and the filter case 111. The filter case 111 has, on the outer circumferential surface, an external thread portion 112, which is threaded to the internal thread portion 105 of the baffle plate 100. The filter case 111 has, below the external thread portion 112 on the outer circumferential surface, an engaging portion 113, which engages with the step portion 103 of the baffle plate 100. The engaging portion 113 is a projecting rim formed along the entire circumference. The filter case 111 has through holes 114 formed at the lower end of the outer circumferential surface at intervals along the circumference. The through holes 114 allow passage of air from which oil and water have been separated by the urethane foam block 50. The filter case 111 has an oil receiving portion 115, which protrudes downward. The oil receiving portion 115 receives oil that has been separated from air. The oil receiving portion 115 has a through hole 116 for dropping oil that has been separated from air by the urethane foam block 50 into the collected liquid storage portion 54. Thus, a part of the interior of the case 31 below the baffle plate 100 functions as a collected liquid storage portion 54. The filter case 111 corresponds to an accommodation portion.

Operation of the oil separator 3 configured as described above will now be described. A case will be described in which purge air discharged from the air dryer 2 is introduced to the oil separator 3.

As shown in FIG. 12, air that has expanded in the first expansion chamber 45 enters the filter cartridge 110 via the through holes 47b of the cover 47, so that oil and water strike the urethane foam block 50 and are separated from the air. The liquid containing the water and the oil trapped by the urethane foam block 50 reaches the upper surface of the bottom of the filter case 111 through the inside of the urethane foam block 50 and then drops through the through hole 116 of the oil receiving portion 115 of the filter case 111 into the collected liquid storage portion 54, and is stored in the collected liquid storage portion 54. The liquid that has been stored in the collected liquid storage portion 54 enters the drain hose 34 from the drain outlet 33.

In contrast, air from which oil and water have been separated in the filter cartridge 110 enters the space between the filter case 111 and the large diameter portion 102 of the baffle plate 100 through the through holes 114 in the side face of the filter case 111. The oil and water remaining in the air that has passed through the filter cartridge 110 strike the large diameter portion 102 of the baffle plate 100 and are separated from the air. The oil and water then drip into the collected liquid storage portion 54 along the inner wall of the large diameter portion 102 of the baffle plate 100. The air that has entered the space between the filter case 111 and the large diameter portion 102 of the baffle plate 100 enters the space between the small diameter portion 101 of the baffle plate 100 and the case 31 through the gap between the large diameter portion 102 of the baffle plate 100 and the case 31. The air that has entered the space between the small diameter portion 101 of the baffle plate 100 and the case 31 passes through the communication hole 47c of the cover 47 and the communication section 32a of the lid 32, and is discharged through the outlet 40. The oil that has been separated from the air in the space between the baffle plate 100 and the case 31 drips into the collected liquid storage portion 54 along the outer surface of the baffle plate 100 or the inner wall of the case 31. Thus, since the baffle plate 100 restrains the collected liquid stored in the collected liquid storage portion 54 from splashing due to vibrations generated during driving of the vehicle. This restrains collected liquid from being discharged through the outlet 40 due to splashing to the vicinity of the outlet 40 and oil from being entrained again in the cleaned air.

The third embodiment provides the following advantage in addition to the advantages (5) and (6) of the second embodiment.

(7) The baffle plate 100 is provided in the case 31. Thus, when cleaned air, from which oil has been separated, passes through the case 31, the baffle plate 100 hampers the flow of the cleaned air and allows the cleaned air to be discharged to the outside without excessively contacting the collected liquid. This prevents the cleaned air from entraining the collected liquid.

The above described embodiments may be modified as follows.

Figure 9:
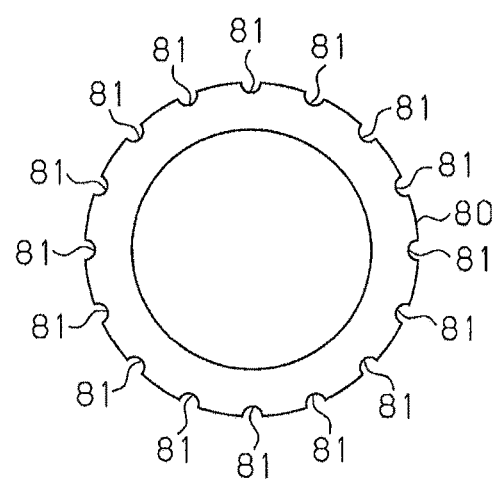
FIG. 9 is a top view illustrating the shape of a baffle plate of a modification used in an oil separator.
Figure 10:
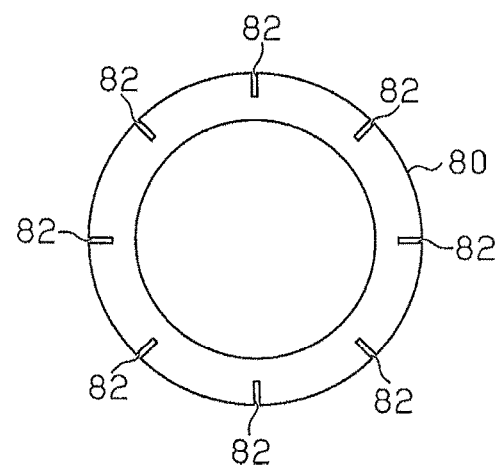
FIG. 10 is a top view illustrating the shape of a baffle plate of a modification used in an oil separator.

In each of the above illustrated embodiments, the baffle plate 80 may be provided with gaps that allow oil and the like to drip. For example, as shown in FIG. 9, semicircular gaps 81 may be formed in the outer circumference of the baffle plate 80 at intervals. Alternatively, as shown in FIG. 10, slit-like gaps 82 may be formed in the outer circumference of the baffle plate 80 at intervals. The shape of the gap is not limited to semicircular or slit-like, but may be any other shape. Gaps may be formed on the inner circumference of the baffle plate 80. These structures allow oil and the like that has dropped onto the baffle plate 80 to readily drip into the collected liquid storage portion 54.

In the first embodiment, the baffle plate 80 is placed on the upper surface of the flange portion 48b. However, if the flange portion 48b is not provided, the baffle plate 80 may be arranged regardless of the flange portion 48b.

In the first embodiment, the baffle plate 80 is provided on the outer circumference of the accommodation member 48. However, in an oil separator in which the capacity limit of collected liquid is set below the accommodation member 48, a disk-shaped baffle plate may be provided that covers the interior of the case 31 and has gaps.

Figure 13:
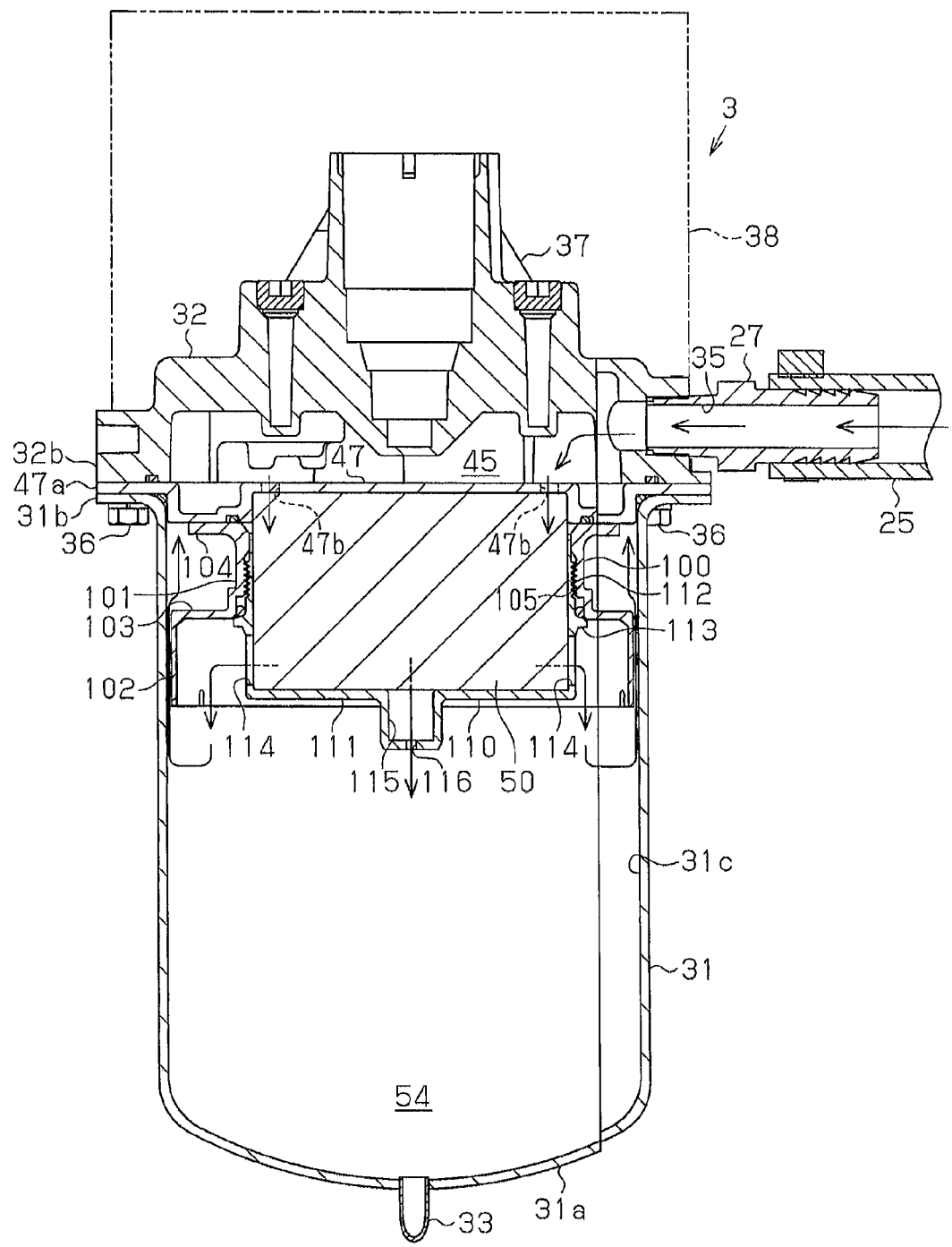
FIG. 13 is a cross-sectional view illustrating the internal structure of an oil separator of a modification.

In the third embodiment, the axial dimension of the baffle plate 100 and the filter cartridge 110 may be reduced as shown in FIG. 13. This increases the capacity of the collected liquid storage portion 54.

Figure 14:
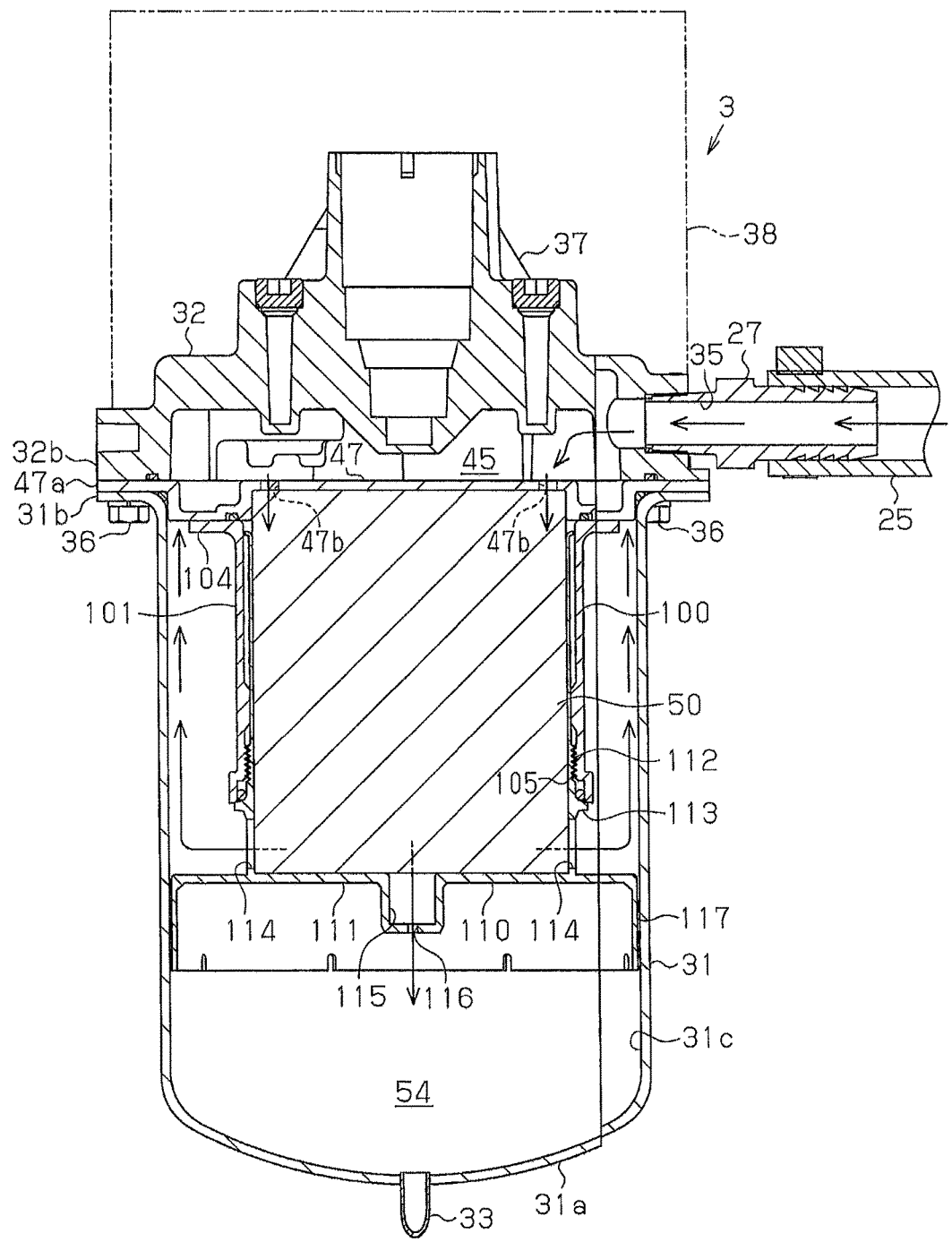
FIG. 14 is a cross-sectional view illustrating the internal structure of an oil separator of a modification.

In the third embodiment, the large diameter portion 102 of the baffle plate 100 restrains splashing of the liquid stored in the collected liquid storage portion 54. This function may be provided to the filter cartridge 110. For example, as shown in FIG. 14, the large diameter portion 102 and the step portion 103 of the baffle plate 100 may be omitted, and a cylindrical baffle plate 117 may be attached to the lower end of the outer circumferential surface of the filter cartridge 110. The baffle plate 117 has a closed end and opens downward. The baffle plate 117 restrains collected liquid in the collected liquid storage portion 54 from being splashed by vibrations generated during driving of the vehicle.

To limit the height of the air dryer 2 and the oil separator 3 in the vertical direction, the inlet 35 of the oil separator 3 may be located above the connection port of the purge air discharge cover 24 in the vertical direction. Alternatively, the inlet 35 of the oil separator 3 may be located below the connection port of the purge air discharge cover 24 in the vertical direction.

In the above illustrated embodiments, the distal end of the drain hose 34 is located above the lid 32 of the oil separator 3. However, as long as collected liquid is prevented from leaking from the distal end of the drain hose 34, the distal end of the drain hose 34 may be located below the lid 32 of the oil separator 3.

In the above illustrated embodiments, the drain hose 34 is connected to the drain outlet 33 of the case 31. However, the drain hose 34 may be omitted, and a plug may be provided on the drain outlet 33 so that the collected liquid can be directly discharged from the drain outlet 33.

In the above illustrated embodiments, the first expansion chamber 45, the second expansion chamber 51, and the third expansion chamber 59 are provided in the oil separator 3. However, at least one of the first expansion chamber 45, the second expansion chamber 51, and the third expansion chamber 59 may be employed. Alternatively, four or more expansion chambers may be provided.

In the above illustrated embodiments, a member such as a nonwoven fabric filter may be provided upstream or downstream of the urethane foam block 50 or in the expansion chambers 45, 51. In this case, the removal rate of the oil component is increased. Furthermore, a member such as a nonwoven fabric filter may be charged with static electricity. In this case, the removal rate of the oil component is further increased.

In above illustrated embodiments, the urethane foam block 50 is employed as the impingement member, but other members such as a crushed aluminum member may be employed.

DESCRIPTION OF THE REFERENCE NUMERALS

1 . . . Compressor, 2 . . . Air Dryer, 3 . . . Oil Separator, 21 . . . Case, 22 . . . Support Member, 23 . . . Purge Air Outlet, 24 . . . Purge Air Discharge Cover, 25 . . . Connecting Hose, 27 . . . Coupling Member, 31 . . . Case, 31a . . . Bottom Portion, 31b . . . Flange Portion, 32 . . . Lid, 32a . . . Communication Section, 32b . . . Flange Portion, 32c . . . Threaded Bores, 33 . . . Drain Outlet, 34 . . . Drain Hose, 35 . . . Inlet, 36 . . . Bolts, 37 . . . Mounting Member, 38 . . . Chassis, 39 . . . Bolts, 40 . . . Outlet, 41 . . . Connecting Member, 42 . . . Discharge Hose, 45 . . . First Expansion Chamber, 46 . . . Baffle Plates, 47 . . . Cover, 47a . . . Flange Portion, 47b . . . Through Holes, 47c . . . Communication Hole, 48 . . . Accommodation Member, 48a . . . Flange Portion, 48b . . . Flange Portion, 48c . . . Through Holes, 49 . . . Upper Base, 49a . . . Through Holes, 50 . . . Urethane Foam Block, 51 . . . Second Expansion Chamber, 52 . . . Support Lid, 52a . . . Through Holes, 53 . . . Screws, 54 . . . Collected Liquid Storage Portion, 59 . . . Third Expansion Chamber, 60 . . . Support Member, 61 . . . Securing Member, 62 . . . One-touch Coupler, 80 . . . Baffle Plate, 81, 82 . . . Gap, 90 . . . Baffle Plate, 91 . . . Outer Circumferential Surface, 92 . . . Through Holes, 100 . . . Baffle Plate, 101 . . . Small Diameter Portion, 102 . . . Large Diameter Portion, 103 . . . Step Portion, 104 . . . Flange Portion, 105 . . . External Thread Portion, 110 . . . Filter Cartridge, 111 . . . Filter Case, 112 . . . External Thread Portion, 113 . . . Engaging Portion, 114 . . . Through Holes, 115 . . . Oil Receiving Portion, 116 . . . Through Hole, 117 . . . Baffle Plate

The invention claimed is:

1. An oil separator comprising:
a housing including an inlet for introducing the purge air, the inlet being provided with an upper portion of the housing;
an accommodation member located in the housing, the accommodation member comprising a vertically-extending wall portion configured to connect to the housing and defining a side face;
an impingement member located in the accommodation member;
a collected liquid storage portion for storing collected liquid containing oil, the collected liquid storage portion being located below the accommodation member; and
a through hole formed at the side face of the accommodation member, the through hole being configured to communicate the inside of the accommodation member with a space between the accommodation member and the housing,
wherein the oil separator is configured to introduce purge air containing oil into the housing from an air dryer, cause the purge air to strike the impingement member located in the accommodation member to separate oil from the introduced purge air, thereby recovering collected liquid containing the oil, and discharge cleaned air, from which the oil has been separated, to outside of the housing,
wherein the oil separator includes a baffle plate located in the housing between the accommodation member and the collected liquid storage portion, wherein the baffle plate is configured to restrain the cleaned air, from which the oil has been separated, from contacting the collected liquid in the collected liquid storage portion so as to prevent the cleaned air from entraining the collected liquid.

2. The oil separator according to claim 1, wherein the baffle plate is configured to float on a surface of the collected liquid stored in the housing.

3. The oil separator according to claim 1, wherein the baffle plate is fixed to the housing.

4. The oil separator according to claim 1, wherein the baffle plate is provided on an outer circumference of the accommodation member, and the baffle plate is located above the collected liquid storage portion and below the accommodation member.

5. The oil separator according to claim 4, wherein the baffle plate is located at a flange portion, which is provided at a distal end portion of the accommodation member.

6. The oil separator according to claim 1, wherein the baffle plate has a gap for allowing separated oil to drip.

7. The oil separator according to claim 1, wherein the cleaned air is discharged from the through hole via the space between the accommodation member and the housing, and wherein the baffle plate is located above the collected liquid storage portion and below the through hole of the accommodation member.

8. The oil separator according to claim 1, wherein the cleaned air is discharged from the oil separator to the outside of the housing via a space between the accommodation member and the housing, and wherein at least a portion of the baffle plate is configured to extend radially, in a horizontal plane, in the space between the accommodation member and the housing.

9. The oil separator according to claim 1, wherein at least a portion of the baffle plate is configured to extend radially, in a horizontal plane, between the accommodation member and the housing.

10. The oil separator according to claim 1, wherein the baffle plate is configured to hamper the flow of the cleaned air and allow the cleaned air to be discharged to the outside of the housing without contacting the collected liquid in the collected liquid storage portion.

* * * * *